United States Patent
Miller et al.

(10) Patent No.: US 10,144,379 B1
(45) Date of Patent: Dec. 4, 2018

(54) RADIATOR GUARD ASSEMBLY

(71) Applicant: Caterpillar Inc., Peoria, IL (US)

(72) Inventors: Kevin Michael Miller, Morton, IL (US); Rob Alan Sensabaugh, Dunlap, IL (US); Vinayak Ramanath Ugru, Peoria, IL (US); Robert Stephen Comer, Morton, IL (US)

(73) Assignee: Caterpillar Inc., Deerfield, IL (US)

( * ) Notice: Subject to any disclaimer, the term of this patent is extended or adjusted under 35 U.S.C. 154(b) by 33 days.

(21) Appl. No.: 15/592,561

(22) Filed: May 11, 2017

(51) Int. Cl.
*B60R 19/52* (2006.01)

(52) U.S. Cl.
CPC ......... *B60R 19/52* (2013.01); *B60Y 2200/411* (2013.01); *B60Y 2200/412* (2013.01); *B60Y 2200/415* (2013.01)

(58) Field of Classification Search
CPC .................................................... B60R 19/52
USPC ...................................... 296/193.1; 293/115
See application file for complete search history.

(56) References Cited

U.S. PATENT DOCUMENTS

| | | | |
|---|---|---|---|
| 4,092,074 A | 5/1978 | Harper et al. | |
| 4,420,058 A | 12/1983 | Sato et al. | |
| 6,447,032 B1 * | 9/2002 | Howell, Sr. | B60R 9/06 211/59.2 |
| 7,828,097 B2 | 11/2010 | Kondou et al. | |
| 8,365,809 B2 | 2/2013 | Sugimoto et al. | |
| 2007/0062671 A1 | 3/2007 | Sugimoto et al. | |
| 2014/0224558 A1 * | 8/2014 | Kure | E02F 3/7609 180/68.6 |
| 2016/0107580 A1 * | 4/2016 | Dringenberg | B60R 3/02 280/166 |

FOREIGN PATENT DOCUMENTS

EP 1849641 7/2010

* cited by examiner

*Primary Examiner* — Joseph D. Pape
(74) *Attorney, Agent, or Firm* — Derek J. Somogy

(57) ABSTRACT

A radiator guard assembly for a machine includes an aperture plate. The radiator guard assembly also includes a first side sheet extending perpendicularly with respect to the aperture plate. The radiator guard assembly further includes a second side sheet extending perpendicularly with respect to the aperture plate. The second side sheet is spaced apart from the first side sheet. The radiator guard assembly includes a mounting structure coupled to each of the first and second side sheets. The mounting structure includes a base member coupled to the respective side sheet. The mounting structure also includes a first plate extending from the base member. The first plate defines a first aperture. The mounting structure further includes a second plate extending from the base member. The second plate is parallel to first plate. Further, the second plate defines a second aperture that is coaxial with the first aperture.

20 Claims, 5 Drawing Sheets

RADIATOR GUARD ASSEMBLY

TECHNICAL FIELD

The present disclosure relates to a radiator guard assembly associated with a machine.

BACKGROUND

Machines, such as a track type tractor, a wheel loader, an excavator, and the like, generally include a radiator for affecting a heat transfer to coolant fluids used in an operation of the machine. The radiator is exposed to machine surrounding for heat exchange purposes. Thus, the radiator is subjected to dirt and debris during the operation of the machine, especially in earthmoving operations. The radiator is generally protected from the dirt and debris by a radiator guard assembly. The radiator guard assembly is removably coupled to a main frame of the machine. Further, during a maintenance schedule or replacement of the radiator, the radiator guard assembly is removed to allow access to the radiator.

U.S. Pat. No. 4,420,058 describes a radiator guard structure for a vehicle comprising a pair of lift cylinder supports secured to a frame of the vehicle, a pair of hooks secured to the frame, and a radiator cover detachably mounted to the frame for guarding a radiator. The radiator cover has formed or mounted thereto a pair of pins each being engageable with the respective hooks and a pair of mounting seat structures. A resilient mounting is provided between each of said mounting seat structures and each of said lift cylinder supports.

SUMMARY OF THE DISCLOSURE

In one aspect of the present disclosure, a radiator guard assembly for a machine is provided. The radiator guard assembly includes an aperture plate. The radiator guard assembly also includes a first side sheet extending perpendicularly with respect to the aperture plate. The radiator guard assembly further includes a second side sheet extending perpendicularly with respect to the aperture plate. The second side sheet is spaced apart from the first side sheet. The radiator guard assembly includes a mounting structure coupled to each of the first and second side sheets. The mounting structure includes a base member coupled to the respective side sheet. The mounting structure also includes a first plate extending from the base member. The first plate defines a first aperture. The mounting structure further includes a second plate extending from the base member. The second plate is parallel to first plate. Further, the second plate defines a second aperture that is coaxial with the first aperture.

In another aspect of the present disclosure, a machine is provided. The machine includes a main frame. The machine also includes a radiator guard assembly coupled to the main frame. The radiator guard assembly includes an aperture plate. The radiator guard assembly also includes a first side sheet extending perpendicularly with respect to the aperture plate. The radiator guard assembly further includes a second side sheet extending perpendicularly with respect to the aperture plate. The second side sheet is spaced apart from the first side sheet. The radiator guard assembly includes a mounting structure coupled to each of the first and second side sheets. The mounting structure includes a base member coupled to the respective side sheet. The mounting structure also includes a first plate extending from the base member. The first plate defines a first aperture. The mounting structure further includes a second plate extending from the base member. The second plate is parallel to first plate. Further, the second plate defines a second aperture that is coaxial with the first aperture.

In yet another aspect of the present disclosure, a radiator guard assembly for coupling to a main frame of a machine is provided. The radiator guard assembly includes an aperture plate. The radiator guard assembly also includes a first side sheet extending perpendicularly with respect to the aperture plate. The radiator guard assembly further includes a second side sheet extending perpendicularly with respect to the aperture plate. The second side sheet is spaced apart from the first side sheet. The radiator guard assembly also includes a mounting structure coupled to each of the first and second side sheets. The mounting structure is adapted to couple the radiator guard assembly with the main frame. The mounting structure includes a base member coupled to the respective side sheet. The mounting structure also includes a first plate extending from the base member. The first plate defines a first aperture. The mounting structure further includes a second plate extending from the base member. The second plate is parallel to first plate. The second plate defines a second aperture that is coaxial with the first aperture. Further, the first and second apertures align with an aperture in the main frame to receive a fastener for coupling the radiator guard assembly to the main frame.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
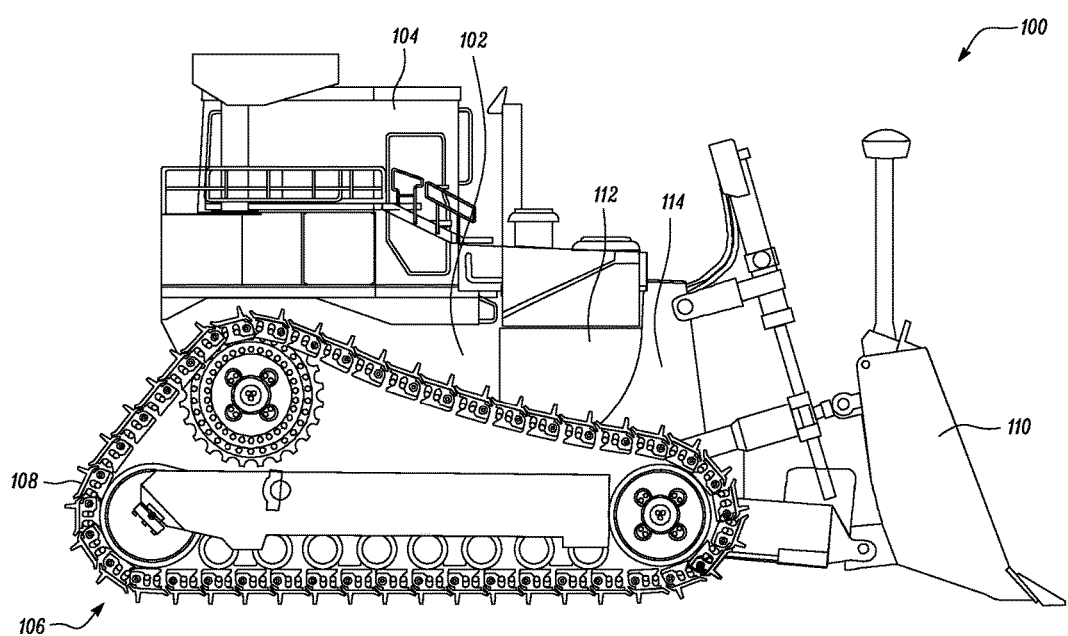
FIG. 1 is a side view of a machine, according to one embodiment of the present disclosure.

FIG. 1 is a side view of a machine 100, according to one embodiment of the present disclosure. In the illustrated embodiment, the machine 100 is embodied as a track type tractor. In alternative embodiments, the machine 100 may include an excavator, a dozer, a harvester, a backhoe, or other types of machines known in the art. The machine 100 may perform one or more than one type of operation associated with an industry such as mining, construction, farming, transportation, or any other industry known in the art. The machine 100 may be embodied as a manual, autonomous, or semi-autonomous machine, without any limitations.

The machine 100 includes a main frame 102 that supports various machine components thereon. An operator cab 104 is also mounted on the main frame 102. When the machine 100 is embodied as a manual or semi-autonomous machine, an operator of the machine 100 is seated within the operator cab 104 to perform one or more machine operations.

The main frame 102 rotatably supports an undercarriage system 106. The undercarriage system 106 includes a pair of ground engaging members 108 each of which is embodied as a track in the illustrated embodiment of FIG. 1. The ground engaging members 108 rotate in order to propel the machine 100 on a ground surface. Alternatively, it can be contemplated to embody the set of ground engaging members 108 in the form of wheels (not shown) such that the wheels propel the machine 100.

The machine 100 also includes a work implement 110 coupled at a front end of the machine 100, respectively. The work implement 110 is embodied as a blade. Further, the machine 100 may also include another work implement, such as, a ripper coupled at a rear end of the machine 100. Further, an engine (not shown) is mounted on the main frame 102 for providing propulsion power to the machine 100. More particularly, the engine is mounted within an enclosure 112 formed in the main frame 102. The engine may be an internal combustion engine such as a compression ignition diesel engine, but in other embodiments the engine might include a gas turbine engine.

Figure 2:
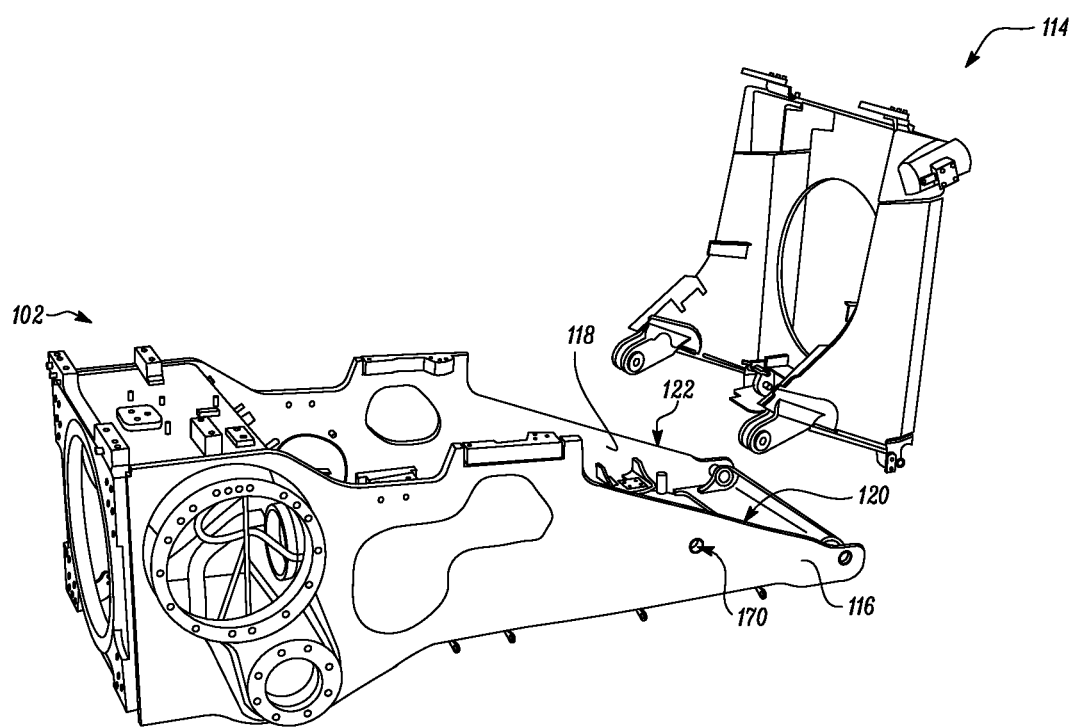
FIG. 2 is an exploded view of a radiator guard assembly and a main frame associated with the machine of FIG. 1.
Figure 3:
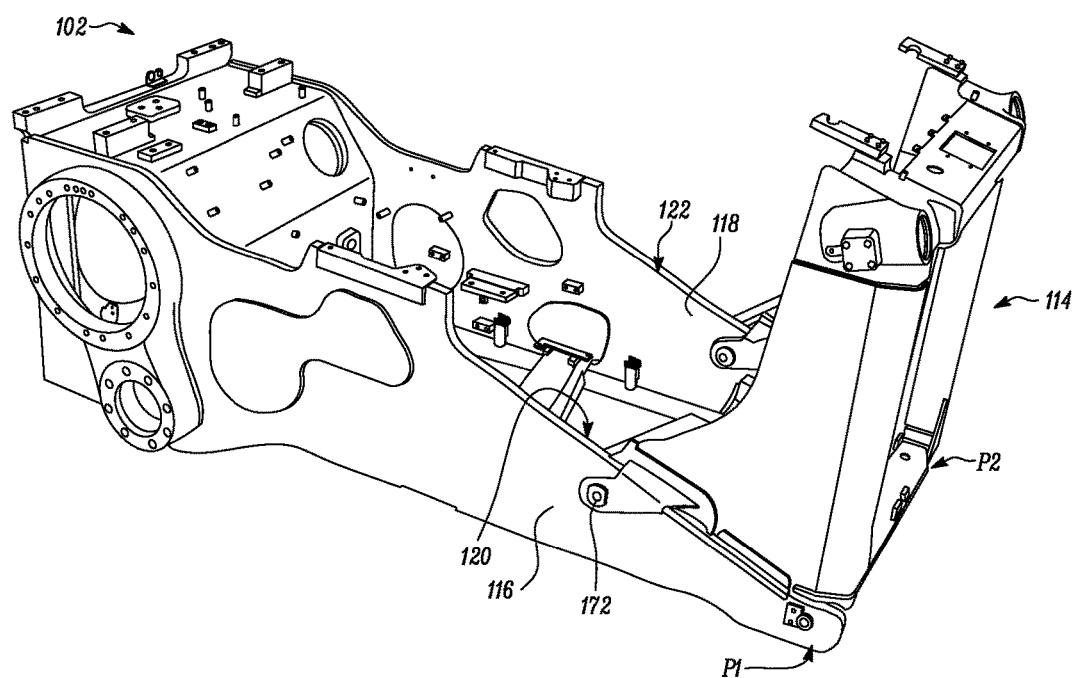
FIG. 3 is a perspective view of the radiator guard assembly coupled to the main frame.

The machine 100 includes a radiator guard assembly 114. A radiator (not shown) is mounted within the radiator guard assembly 114. The radiator is mounted proximal to the engine for engine cooling purposes. The radiator is protected from contact of dust and debris by the radiator guard assembly 114. The radiator guard assembly 114 will now be explained in detail with reference to FIGS. 2 to 5. Referring to FIGS. 2 and 3, the radiator guard assembly 114 is coupled to the main frame 102. More particularly, the radiator guard assembly 114 is coupled to a first side rail 116 and a second side rail 118 of the main frame 102. Further, each of the first and second side rails 116, 118 define an upper surface 120, 122, respectively. The radiator guard assembly 114 is swingably mounted to the main frame 102 at pivot points P1, P2 (shown in FIG. 3), respectively, such that the radiator guard assembly 114 can swing about the pivot points P1, P2 to allow access to the radiator.

Figure 4:
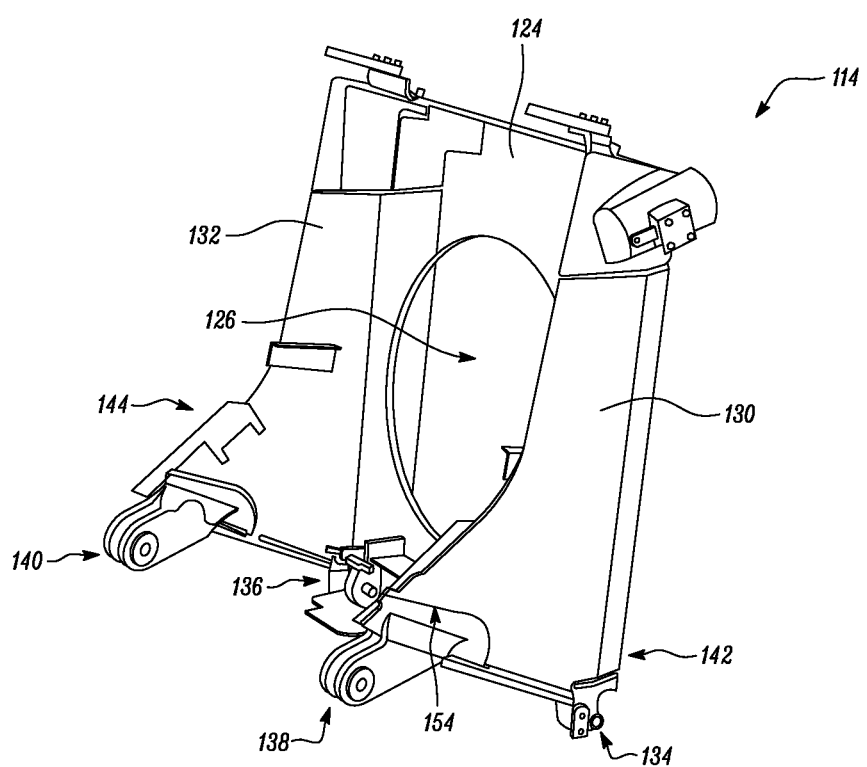
FIG. 4 is a perspective view of the radiator guard assembly, according to one embodiment of the present disclosure.

Referring now to FIG. 4, the radiator guard assembly 114 includes an aperture plate 124. The aperture plate 124 allows air to flow towards the radiator, via a fan that is mounted to the aperture plate 124. The aperture plate 124 is generally square shaped and includes a centrally disposed opening 126. The opening 126 is circular in shape, however, the opening 126 may include any other shape, based on application requirements.

The radiator guard assembly 114 also includes a first side sheet 130 and a second side sheet 132. The first side sheet 130 is similar to the second side sheet 132 in design, dimensions, and construction. Further, the second side sheet 132 is spaced apart from the first side sheet 130. In one example, the first and second side sheets 130, 132 are parallel to each other. The first and second side sheets 130, 132 extend perpendicularly with respect to the aperture plate 124, and are fixedly coupled to the aperture plate 124. The first and second side sheets 130, 132 include a first pivoting means 134 and a second pivoting means 136, respectively. The first and second pivoting means 134, 136 swingably couple the radiator guard assembly 114 with the main frame 102 at the respective pivot points P1, P2.

Each of the first and second side sheets 130, 132 include a first mounting structure 138 and a second mounting structure 140, respectively. The first mounting structure 138 is fixedly coupled to the first side sheet 130. The first mounting structure 138 removably couples the first side sheet 130 of the radiator guard assembly 114 with the first side rail 116 of the main frame 102. Further, the second mounting structure 140 is fixedly coupled to the second side sheet 132. The second mounting structure 140 removably couples the second side sheet 132 of the radiator guard assembly 114 with the second side rail 118 of the main frame 102.

As shown in the accompanying figures, the first and second mounting structures 138, 140 extend from lower portions 142, 144 of the respective first and second side sheets 130, 132. Each of the first and second mounting structures 138, 140 removably couple the first and second side sheets 130, 132 of the radiator guard assembly 114 with the main frame 102, via a double shear attachment.

The first mounting structure 138 is similar in design, dimension, and construction to the second mounting structure 140. For explanatory purposes, the first mounting structure 138 will now be explained in detail with reference to FIG. 5. However, it should be noted that the details of the first mounting structure 138 provided below are equally applicable to the second mounting structure 140, without limiting the scope of the present disclosure.

Figure 5:
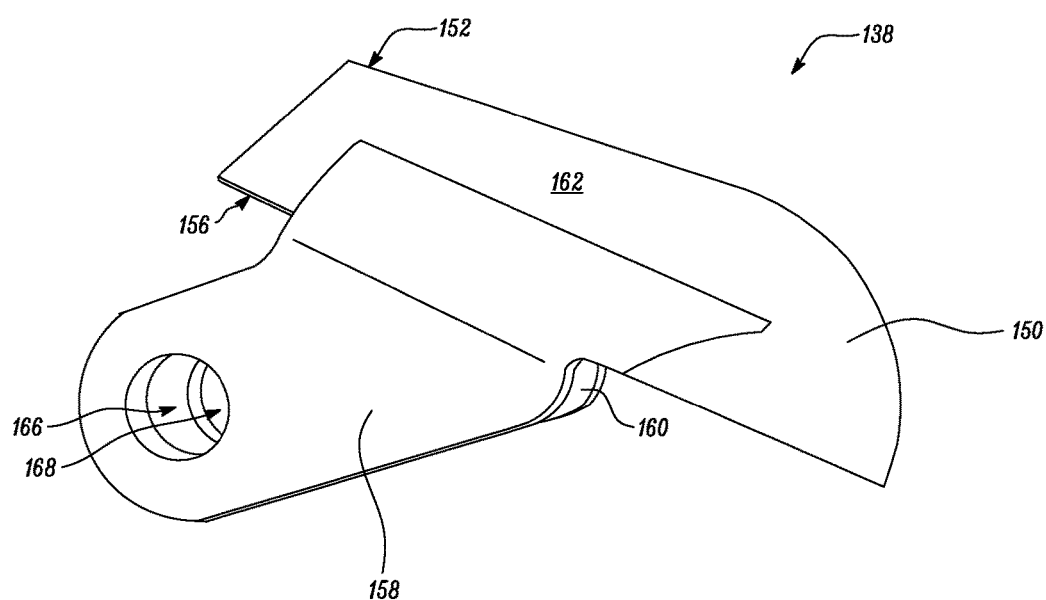
FIG. 5 is a perspective view of a mounting structure of the radiator guard assembly, according to one embodiment of the present disclosure.

Referring to FIG. 5, a perspective view of the first mounting structure 138 is shown. The first mounting structure 138 includes a base member 150. The base member 150 is coupled to the first side sheet 130 of the radiator guard assembly 114. More particularly, a top surface 152 of the base member 150 contacts with a bottom surface 154 (shown in FIG. 4) defined on the first side sheet 130. In one example, the base member 150 is coupled to the first side sheet 130 by welding, without any limitations.

The first mounting structure 138 is fork shaped. Accordingly, a first plate 158 extends from a first surface 162. Further, a second plate 160 extends from a second surface (not shown) of the base member 150. The second surface is defined opposite to the first surface 162. Further, the first and second plates 158, 160 are parallel to each other, and extend angularly from the base member 150. The first plate 158 is similar in design and dimensions to the second plate 160.

A lower end of each of the first and second plates 158, 160 is semi-circular in shape. The first plate 158 defines a first aperture 166. Further, the second plate 160 defines a second aperture 168 that is co-axial with the first aperture 166. The first and second apertures 166, 168 are defined proximate to the lower end of the respective first and second plates 158, 160. For coupling the radiator guard assembly 114 with the main frame 102, the first and second apertures 166, 168 are aligned with an aperture 170 (shown in FIG. 2) defined in the first side rail 116 for receiving a mechanical fastener 172 (shown in FIG. 3). The mechanical fastener 172 couples the first mounting structure 138 of the radiator guard assembly 114 with the first side rail 116 of the main frame 102, via a double shear attachment.

In the illustrated example, the mechanical fastener 172 is embodied as a steel pin. Alternatively, the mechanical fastener 172 may embody any other type of pin or bolt, without any limitations. It should be noted that the apertures 166, 168, 170 are embodied as through-holes. Further, for servicing or replacement of the radiator, the mechanical fasteners 172 may be removed so that the radiator guard assembly 114 may swing about the pivot points P2, P2 to provide access to the radiator.

In the illustrated example, the first mounting structure 138 is embodied as a unitary component. Alternatively, components of the first mounting structure 138, such as the base member 150, the first plate 158, and the second plate 160 may be manufactured as separate components that are later assembled to form the first mounting structure 138. In one example, the first mounting structure 138 is manufactured by a casting process. In other examples, the first mounting structure 138 may be manufactured using any additive manufacturing process, such as 3D printing, or any subtractive manufacturing process, such as machining, without any limitations.

Further, the first mounting structure 138 is made of a material that exhibits high strength and does not deform during operation of the machine 100. In one example, the first mounting structure 138 is made of a metal, such as cast steel. Alternatively, the first mounting structure 138 may be made of any other metal based on application requirements, without any limitations

INDUSTRIAL APPLICABILITY

The present disclosure relates to the radiator guard assembly 114 associated with the machine 100. The radiator guard assembly 114 is simple in design and manufacturing, cost effective, and easy to couple with the main frame 102.

The mounting structures 138, 140 of the radiator guard assembly 114 provide a double shear pin connection to the main frame 102. This type of connection reduces likelihood of pin/fastener deformation during machine operation. Also, the double shear pin connection makes removal of the pin/fastener easier for servicing and replacement. Further, due to the design of the mounting structures 138, 140, the first and second side sheets 130, 132 rest directly above the respective side rails 116, 118 of the main frame 102, thereby providing more clearance between the main frame 102 and the undercarriage system 106.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A radiator guard assembly for a machine, the radiator guard assembly comprising:
   an aperture plate;
   a first side sheet extending perpendicularly with respect to the aperture plate;
   a second side sheet extending perpendicularly with respect to the aperture plate, the second side sheet being spaced apart from the first side sheet; and
   a mounting structure coupled to each of the first and second side sheets, the mounting structure comprising:
      a base member coupled to the respective side sheet;
      a first plate extending from the base member, wherein the first plate defines a first aperture; and
      a second plate extending from the base member, the second plate being parallel to first plate, wherein the second plate defines a second aperture that is coaxial with the first aperture.

2. The radiator guard assembly of claim 1, wherein the radiator guard assembly is adapted to couple to a main frame of the machine.

3. The radiator guard assembly of claim 2, wherein the radiator guard assembly is coupled to the main frame by a double shear attachment.

4. The radiator guard assembly of claim 2, wherein the first and second apertures of the mounting structure align with an aperture in the main frame to receive a fastener for coupling the radiator guard assembly to the main frame.

5. The radiator guard assembly of claim 4, wherein the fastener includes a steel pin.

6. The radiator guard assembly of claim 4, wherein the mounting structure couples with a side rail of the main frame.

7. The radiator guard assembly of claim 1, wherein the mounting structure is fork shaped.

8. The radiator guard assembly of claim 1, wherein the mounting structure is a unitary component.

9. A machine comprising:
   a main frame; and
   a radiator guard assembly coupled to the main frame, the radiator guard assembly comprising:
      an aperture plate;
      a first side sheet extending perpendicularly with respect to the aperture plate;
      a second side sheet extending perpendicularly with respect to the aperture plate, the second side sheet being spaced apart from the first side sheet; and
      a mounting structure coupled to each of the first and second side sheets, the mounting structure adapted to couple the radiator guard assembly with the main frame, the mounting structure comprising:
         a base member coupled to the respective side sheet;
         a first plate extending from the base member, wherein the first plate defines a first aperture; and
         a second plate extending from the base member, the second plate being parallel to first plate, wherein the second plate defines a second aperture that is coaxial with the first aperture.

10. The machine of claim 9, wherein the radiator guard assembly is coupled to the main frame by a double shear attachment.

11. The machine of claim 9, wherein the first and second apertures of the mounting structure align with an aperture in the main frame to receive a fastener for coupling the radiator guard assembly to the main frame.

12. The machine of claim 11, wherein the fastener includes a steel pin.

13. The machine of claim 11, wherein the mounting structure is coupled to a side rail of the main frame.

14. The machine of claim 9, wherein the mounting structure is fork shaped.

15. The machine of claim 9, wherein the mounting structure is a unitary component.

16. A radiator guard assembly for coupling to a main frame of a machine, the radiator guard assembly comprising:
   an aperture plate;
   a first side sheet extending perpendicularly with respect to the aperture plate;
   a second side sheet extending perpendicularly with respect to the aperture plate, the second side sheet being spaced apart from the first side sheet; and
   a mounting structure coupled to each of the first and second side sheets, the mounting structure adapted to couple the radiator guard assembly with the main frame, the mounting structure comprising:
      a base member coupled to the respective side sheet;
      a first plate extending from the base member, wherein the first plate defines a first aperture; and a second plate extending from the base member, the second plate being parallel to first plate, wherein the second plate defines a second aperture that is coaxial with the first aperture, wherein the first and second apertures align with an aperture in the main frame to receive a fastener for coupling the radiator guard assembly to the main frame.

17. The radiator guard assembly of claim 16, wherein the radiator guard assembly is coupled to the main frame by a double shear attachment.

18. The radiator guard assembly of claim 16, wherein the mounting structure is coupled to a side rail of the main frame.

19. The radiator guard assembly of claim 16, wherein the mounting structure is fork shaped.

20. The radiator guard assembly of claim 16, wherein the mounting structure is a unitary component.

\* \* \* \* \*